United States Patent
Maruyama (10) Patent No.: US 8,745,356 B2
(45) Date of Patent: Jun. 3, 2014

(54) PROCESSOR AND ADDRESS TRANSLATING METHOD

(75) Inventor: Masaharu Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 12/825,959

(22) Filed: Jun. 29, 2010

(65) Prior Publication Data

US 2010/0332790 A1    Dec. 30, 2010

(30) Foreign Application Priority Data

Jun. 30, 2009   (JP) ................. 2009-156305

(51) Int. Cl.
*G06F 9/26*    (2006.01)
*G06F 9/34*    (2006.01)

(52) U.S. Cl.
USPC ........................................ 711/205

(58) Field of Classification Search
USPC ................................. 711/203, 205
See application file for complete search history.

(56) References Cited

U.S. PATENT DOCUMENTS

| | | | |
|---|---|---|---|
| 2003/0196066 A1* | 10/2003 | Mathews | 711/207 |
| 2004/0024986 A1* | 2/2004 | Devereux | 711/205 |
| 2004/0049630 A1* | 3/2004 | Stark | 711/108 |
| 2005/0050277 A1 | 3/2005 | Shen et al. | |
| 2008/0172524 A1* | 7/2008 | Singh et al. | 711/108 |

FOREIGN PATENT DOCUMENTS

| | | |
|---|---|---|
| JP | 57-006956 | 1/1982 |
| JP | 3-164845 | 7/1991 |
| JP | 6-187244 | 7/1994 |
| JP | 8-115262 | 5/1996 |
| JP | 2007-504552 | 3/2007 |

OTHER PUBLICATIONS

Office Action issued by the Japanese Patent Office on Aug. 27, 2013 in the corresponding Japanese patent application No. 2009-156305.

* cited by examiner

*Primary Examiner* — Ryan Bertram
(74) *Attorney, Agent, or Firm* — Staas & Halsey LLP (57) ABSTRACT

An address translation buffer of a processor including a memory unit that has a first area with first entries storing first address translation pairs of a virtual address and a physical address corresponding to the virtual address, each of the first address translation pairs is subjected to a index tag which is a part of the virtual address, and a second area with second entries storing second address translation pairs, each of the second address translation pairs is subjected to a whole part of the virtual address, and a search unit that searches the first area for an address translation pair by using a index tag included in a virtual address to be translated, and searches the second area for the address translation pair by using a whole part of the virtual address when the address translation pair is not found in the first area.

11 Claims, 10 Drawing Sheets

PROCESSOR AND ADDRESS TRANSLATING METHOD

CROSS-REFERENCE TO RELATED APPLICATIONS

This application is based upon and claims priority to prior Japanese Patent Application No. 2009-156305 filed on Jun. 30, 2009 in the Japan Patent Office, the entire contents of which are incorporated herein by reference.

FIELD

Various embodiments described herein relate to a processor and an address translating method.

BACKGROUND

A virtual memory system for virtually providing a memory space larger than a physical memory space that a main memory originally provides has been utilized so far. A computer to which the virtual memory system is applied has a data structure referred to as a page table including pairs of a virtual address and a physical address (hereinafter referred to as address translation pairs) in a main memory in order to translate a virtual address to a physical address. When address translation is desired, for example, when a virtual address is included in an instruction that a CPU (Central Processing Unit) which serves as a processor has fetched, the computer gains access to the main memory and executes the address translation with reference to the page table that the main memory holds.

However, much time is taken to refer to the page table in the main memory each time address translation is to be executed. Therefore, in general, the computer installs in the CPU a cache memory dedicated to address translation which is referred to as a TLB (Translation Lookaside Buffer) as an address translation buffer where some address translation pairs are held. The TLB is searched before referring to the page table in the main memory.

When the computer executes a memory access, first, the computer translates a virtual address to the corresponding physical address by using the TLB and then gains access directly to the memory using the physical address. Thus, the speed at which the TLB is accessed directly acts on the total speed at which the memory is accessed. In order to execute the address translation at a high speed, it is effective to reduce the capacity of the TLB to be searched. However, if the capacity of the TLB is too small, a virtual address to be translated may not find in the TLB a physical address to match (TLB miss) in many cases and the computer has to refer to the page table each time the TLB miss occurs. As a result, much time may be taken and the performance may be degraded.

In recent years, computer programs have used a large address area and hence the influence to the memory access has been increased than before when the capacity of TLB is small. On the other hand, the time taken for search may be increased if the capacity of the TLB is increased, which may hinder the improvement in the performance of hardware.

A full associative method and a set associative method are proposed as methods for referring to the TLB. The full associative method refers to the whole virtual address as a tag and the set associative method refers to a part of the virtual address as an index tag. A CAM (Content Addressable Memory) and a RAM (Random Access Memory) are given as memories for the TLB by way of example.

When adopting the full associative method, the CAM has been used as the memory that allows simultaneous search for a plurality of entries. When the CAM is used as the TLB, although the circuit size is increased, the TLB may be searched at a high speed even if the full associative method is employed.

When adopting the set associative method, the RAM has been used as the memory of the TLB. The RAM allows registration of many TLB entries with a relatively small size of mounting area of the TLB in the processor. However, only one entry is allowed to be referred to at a same time. In the set associative method, a part of the virtual address is referred to as the index tag and an entry which is specified with the index tag is read out of the memory, so that the TLB is searched at a high speed even if the RAM is used. However, in the set associative method, different virtual addresses having the same index part are registered into the same entry. Thus, when an access to the virtual addresses having the same index part is frequently gained, the entry may be overwritten and previous data may be lost. If multiple sets of index tags and multiple ways are used, the frequency at which the entry is overwritten is reduced in the set associative method in comparison with a direct mapping method having one set of index tags and one way. On the other hand, the frequency at which the entry is purged in the set associative method is higher than the frequency in the full associative method.

As described above, the TLB with the set associative method using the RAM and the TLB with the full associative method using the CAM have both merits and demerits and hence both the TLBs are frequently used in combination. If both the TLBs are to be used in combination, it may be desirable to register TLB entries necessary for important processing such as trap processing which is executed using a kernel of an OS (Operating System) into the TLB with the full associative method so as not to be purged from the TLB. In the full associative method, registration into an arbitrary entry is possible, and therefore as long as the maximum number of entries is checked, the TLB is controlled so that the TLB entry is not purged. The maximum number of entries is 16 or 32, for example.

[Patent Document 1] Japanese Laid-open Patent Publication No. 08-115262

[Patent Document 2] Japanese Laid-open Patent Publication No. 06-187244

[Patent Document 3] Japanese Laid-open Patent Publication No. 57-006956

SUMMARY

According to an embodiment, an address translation buffer of a processor includes a memory unit that has a first area with first entries storing first address translation pairs of a virtual address and a physical address corresponding to the virtual address, each of the first address translation pairs is subjected to a index tag which is a part of the virtual address, and a second area with second entries storing second address translation pairs, each of the second address translation pairs is subjected to a whole part of the virtual address, and a search unit that searches the first area for an address translation pair by using a index tag included in a virtual address to be translated, and searches the second area for the address translation pair by using a whole part of the virtual address when the address translation pair is not found in the first area.

DESCRIPTION OF EMBODIMENTS

Next, embodiments of a processor and an address translating method according to the present invention will be described in detail with reference to the accompanying drawings. The present invention is not limited to the embodiments which will be described hereinbelow.

Figure 1:
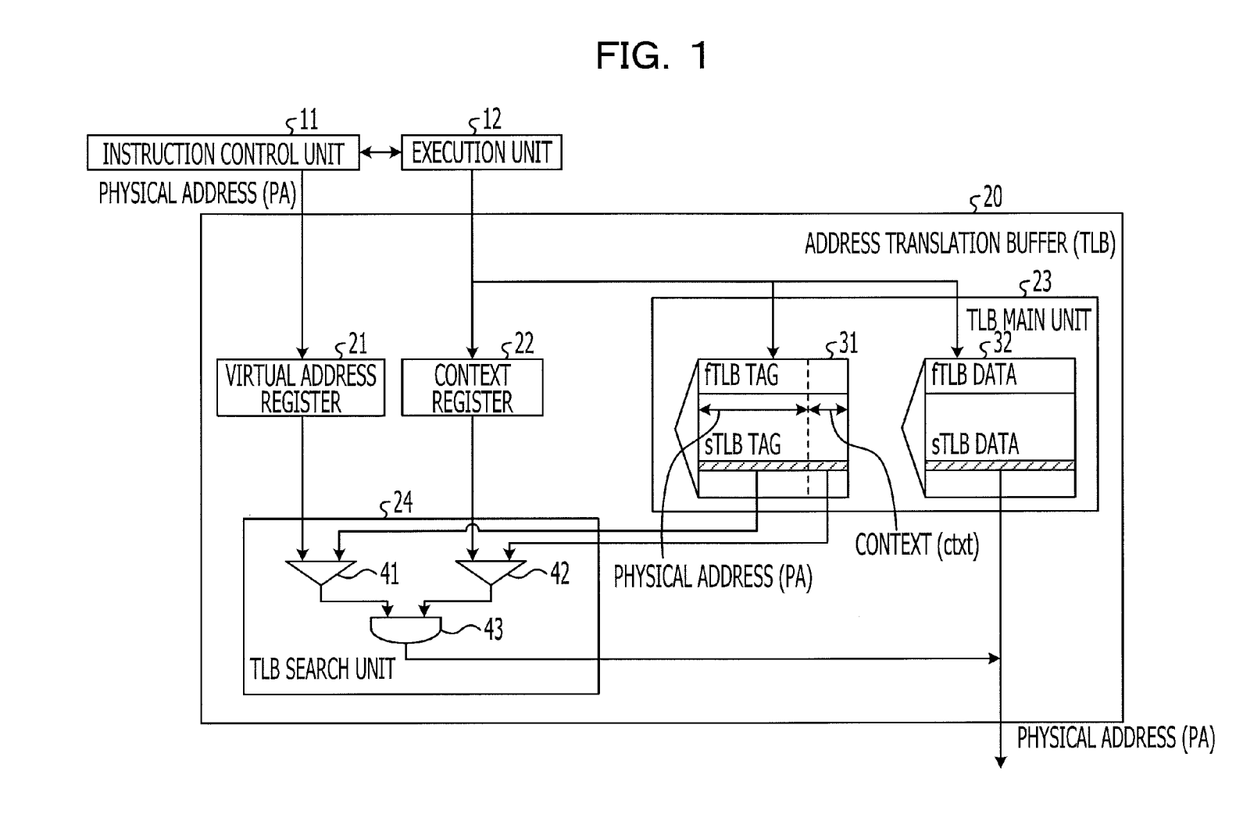
FIG. 1 is a schematic diagram illustrating an example of a configuration of an address translation buffer according to a first embodiment.
Figure 2:
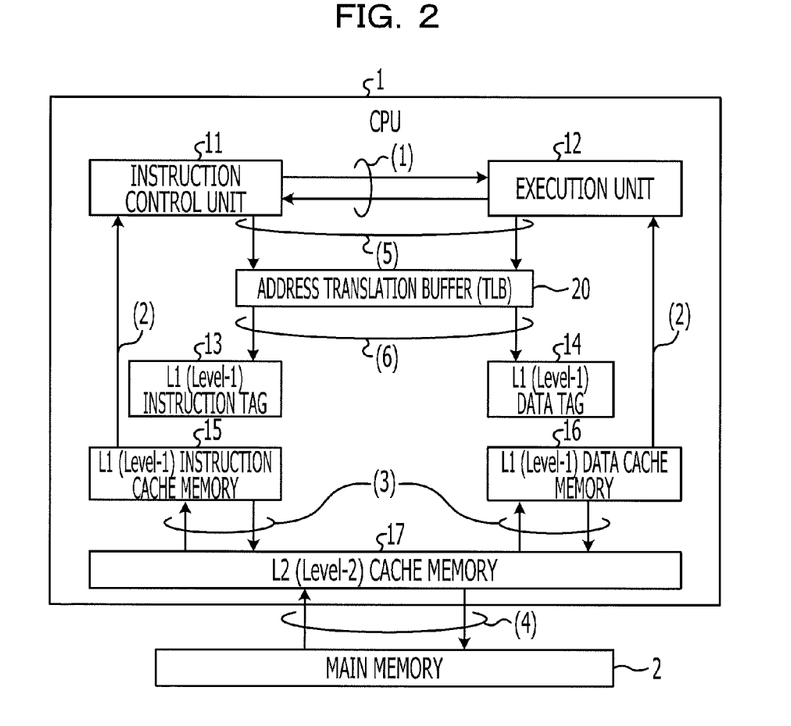
FIG. 2 is a schematic diagram illustrating an example of a configuration of a processor according to the first embodiment.

FIG. 1 is a schematic diagram illustrating an example of a configuration of an address translation buffer according to a first embodiment. FIG. 2 is a schematic diagram illustrating an example of a configuration of a processor according to the first embodiment. FIG. 2 illustrates some elements included in a CPU as the processor. Therefore, FIG. 2 does not illustrate all the elements included in the processor according to the first embodiment and the processor according to the first embodiment may not necessary to include all the elements illustrated in FIG. 2. In addition, the numbers (1) to (6) illustrated in FIG. 2 are added merely for the convenience of explanation and do not indicate order in which the process is executed.

As illustrated in FIG. 2, a CPU 1 as the processor includes therein an instruction control unit 11, an execution unit 12, an L1 (Level-1) instruction tag 13, an L1 data tag 14, an L1 instruction cache memory 15, an L1 data cache memory 16, an L2 (Level-2) cache memory 17 and a TLB 20.

The CPU 1 which is configured as described above executes an arithmetic operation in accordance with an instruction stored in a storage device installed in a computer and processes information in accordance with a result of the arithmetic operation executed. Here, the "instruction" does not mean a command which is input through a keyboard by a user of a computer and a command as one line of a program which has been programmed by a software developer. A command as mentioned above is translated to a computer executable machine language using the computer and then is reconfigured to computer recognizable binary numbers, and then the binary numbers are divided into minimum units which are executed by the CPU 1. As a result, an instruction which is processed by the CPU 1 is obtained.

The instruction control unit 11 controls the flow of processing executed by the CPU 1. Specifically, the instruction control unit 11 fetches an instruction to be processed by the CPU 1 out of the storage device, decodes the fetched instruction and sends the execution unit 12 a result of decoding executed (see (1) in FIG. 2). The execution unit 12 is a processing unit for executing an arithmetic logical operation. Specifically, the execution unit 12 reads data to be executed out of the storage device, arithmetically and logically operates the data in accordance with the instruction which has been decoded by the instruction control unit 11 and sends the instruction control unit 11a result of the arithmetic operation executed (see (1) in FIG. 2).

The instruction control unit 11 and the execution unit 12 read instructions and data from storage devices including a main memory and cache memories. Examples of the cache memories include an L1 cache memory and an L2 cache memory. The cache memories such as the L1 cache memory and the L2 cache memory are hierarchically provided in the CPU 1. In the example illustrated in FIG. 2, the L1 instruction cache memory 15 which is an L1 cache memory dedicated to instructions and the L1 data cache memory 16 which is an L1 cache memory dedicated to data are provided in the CPU 1 as the L1 cache memories. In addition, as the L2 cache memory, the L2 cache memory 17 is provided in the CPU 1. Although a main memory 2 is not included in the CPU 1 and provided outside of the CPU 1, the main memory 2 is one of the storage devices constituting the memory hierarchy.

The L1 instruction cache memory 15 and the L1 data cache memory 16 may operate with a clock signal which is the same as the clock signal in the CPU 1 and the L1 cache memories respond to requests given from the instruction control unit 11 and the execution unit 12 at a high speed (see (2) in FIG. 2). However, in many cases, the capacities of the L1 instruction cache memory 15 and the L1 data cache memory 16 are about 32 KB to 128 KB in total and hence storage of mass information is impossible. Therefore, the L2 cache memory 17 will store frequently used pieces of information among pieces of information that the L1 instruction cache memory 15 and the L1 data cache memory 16 does not store therein (see (3) in FIG. 2). Information that the L2 cache memory 17 does not store therein will be stored in the main memory 2 (see (4) in FIG. 2).

At the time the instruction control unit 11 and the execution unit 12 start processing, instruction and data have been stored in the main memory 2 and nothing has been stored in the L1 instruction cache memory 15, the L1 data cache memory 16 or the L2 cache memory 17. When the instruction control unit 11 and the execution unit 12 fetches the instruction and reads data out of the main memory 2, the instruction and data are loaded to the L1 instruction cache memory 15, the L1 data cache memory 16 or the L2 cache memory 17. After the loading, the instruction control unit 11 and the execution unit 12 read the instruction and data out of the L1 instruction cache memory 15, the L1 data cache memory 16 or the L2 cache memory 17 instead of main memory 2. The cache memories each operates with a clock signal of same frequency with the clock signal of the CPU 1, and each of frequencies of the clock signals for the cache memories 15 to 17 is higher that the frequency of the clock signal for the main memory 2.

In other words, the instruction and data that the instruction control unit 11 and the execution unit 12 intend to read have not always been stored in the L1 instruction cache memory 15 and the L1 data cache memory 16. Therefore, the instruction control unit 11 and the execution unit 12 utilize the L1 instruction tag 13 and the L1 data tag 14 instead. That is, when the instruction and data are loaded to the L1 instruction cache memory 15 and the L1 data cache memory 16, information indicating that to which addresses of the main memory the instruction and data are stored is simultaneously set to the L1 instruction tag 13 and the L1 data tag 14. Therefore, when reading the instruction and data, the instruction control unit 11 and the execution unit 12 first send inquiries to the L1 instruction tag 13 and the L1 data tag 14 and check whether the instruction and data to be read have been stored in the L1 instruction cache memory 15 and the L1 data cache memory 16.

A virtual memory method is applied to the CPU 1 illustrated in FIG. 1. Thus, as illustrated in FIG. 2, when the instruction control unit 11 and the execution unit 12 intend to read the instruction and data, first, a virtual address is designated to the TLB 20 (see (5) in FIG. 2), the TLB 20 translates the virtual address to a physical address and then inquires of the L1 instruction tag 13 and the L1 data tag 14 about the presence of the instruction and data (see (6) in FIG. 2).

Returning to FIG. 1, the configuration of the address translation buffer 20 will be described. As illustrated in FIG. 1, the address translation buffer 20 includes therein a virtual address register 21, a context register 22, a TLB main unit 23 and a TLB search unit 24.

The virtual address register 21 is a register for holding a virtual address output from the instruction control unit 11. The context register 22 is a register for holding a context output from the execution unit 12. The context is information used to specify the process of an application from which an instruction has been given.

The TLB main unit 23 includes a tag unit 31 and a data unit 32. The tag unit 31 holds as entries a virtual address and a context. The virtual address and the context are used as tags for search. The data unit 32 holds as entries address translation pairs, each being formed by making a virtual address correspond to a physical address.

The tag unit 31 is configured using a RAM. A first area in which an entry is referred to by the set associative method and a second area in which an entry is referred to by the full associative method are provided in the RAM. Therefore, both the tags referred to by the set associative method and tags referred to by the full associative method are registered into the RAM configuring the tag unit 31. In the example illustrated in FIG. 1, the tags referred to by the set associative method are indicated as sTLB TAGs and the tags referred to by the full associative system are indicated as fTLB TAGs.

The data unit 32 is configured using a RAM where address translation pairs respectively corresponding to data sTLB DATA and fTLB DATA are registered.

Figure 3:
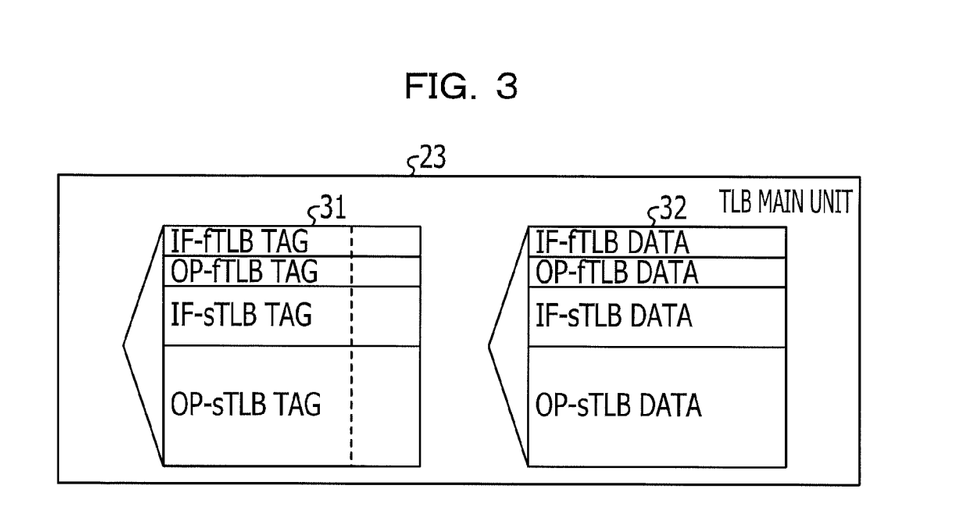
FIG. 3 is a diagram illustrating an example of a TLB main unit into which TLB tags for instruction use and TLB tags for data use are separately registered.

Explaining in more detail, sTLB TAGs for instruction use and data use and fTLB TAGs for instruction use and data use are separately registered. FIG. 3 is a diagram illustrating an example of the TLB main unit 23 in which the above mentioned tags for instruction use and data use are separately registered in the tag unit 31. In FIG. 3, IF-fTLB TAG is a tag for instruction use which is referred to by the full associative method. OP-fTLB TAG is a tag for data use which is referred to by the full associative method. IF-sTLB TAG is a tag for instruction use which is referred to by the set associative method. OP-sTLB TAG is a tag for data use which is referred to by the set associative method.

Likewise, IF-fTLB DATA is an address translation pair corresponding to the tag for instruction use which is referred to by the full associative method. OP-fTLB DATA is an address translation pair corresponding to the tag for data use which is referred to by the full associative method. IF-sTLB DATA is an address translation pair corresponding to the tag for instruction use which is referred to by the set associative method. OP-sTLB DATA is an address translation pair corresponding to the tag for data use which is referred to by the set associative method.

If the tag unit 31 and the data unit 32 are RAMs each having 512 entries, 256 entries are each allocated to OP-sTLB TAG and OP-sTLB DATA and, 128 entries are each allocated to IF-sTLB TAG and IF-sTLB DATA, for example.

Then, 64 entries are each allocated to OP-fTLB TAG and OP-fTLB DATA, for example. Then, 64 entries are each allocated to IF-fTLB TAG and IF-fTLB DATA, for example. OP-fTLB TAG, OP-fTLB DATA, IF-fTLB TAG and IF-fTLB DATA may not use all the 64 entries allocated thereto and may use some of them, for example, 16 entries.

Returning to FIG. 1, the TLB search unit 24 will be described. The TLB search unit 24 determines whether a combination of a virtual address (VA) held in the virtual address register 21 with a value in the context register 22 matches a combination of a virtual address registered in the tag unit 31 with a value of the context registered in the tag unit 31.

A comparison circuit 41 in the TLB search unit 24 compares the virtual address held in the virtual address register 21 with a virtual address registered in the tag unit 31 and outputs a result of comparison to an AND circuit 43. Likewise, a comparison circuit 42 in the TLB search unit 24 compares the value held in the context register 22 with the value of the context (ctxt) registered in the tag unit 31 and outputs a result of comparison to the AND circuit 43. When the virtual address held in the virtual address register 21 matches the virtual address registered in the tag unit 31 and the value held in the context register 22 matches the value of the context (ctxt) registered in the tag unit 31, the AND circuit 43 outputs a value indicative of TLB hit. The reason why matching of the context values is desired in addition to matching of the virtual addresses is that a virtual address to be used for a process may unexpectedly match the same virtual address to be used for a different process.

When the TLB search unit 24 has output the value indicative of TLB hit, the address translation buffer 20 fetches the physical address (PA) corresponding to the virtual address out of the data unit 32 and outputs the fetched physical address. On the other hand, when the TLB search unit 24 has not output the value indicative of TLB hit, that is, the unit 24 has output a value indicative of TLB miss, the instruction control unit 11 acquires an address translation pair corresponding to the virtual address with reference to a page table stored in the main memory 2 and sends the acquired address translation pair to the execution unit 12. The execution unit 12 registers the received address translation pair and a context indicative of a process which is being executed into the TLB main unit 23. Subsequently, the instruction control unit 11 executes again the instruction to translate the virtual address to the corresponding physical address using the address translation pair registered in the TLB.

Figure 4:
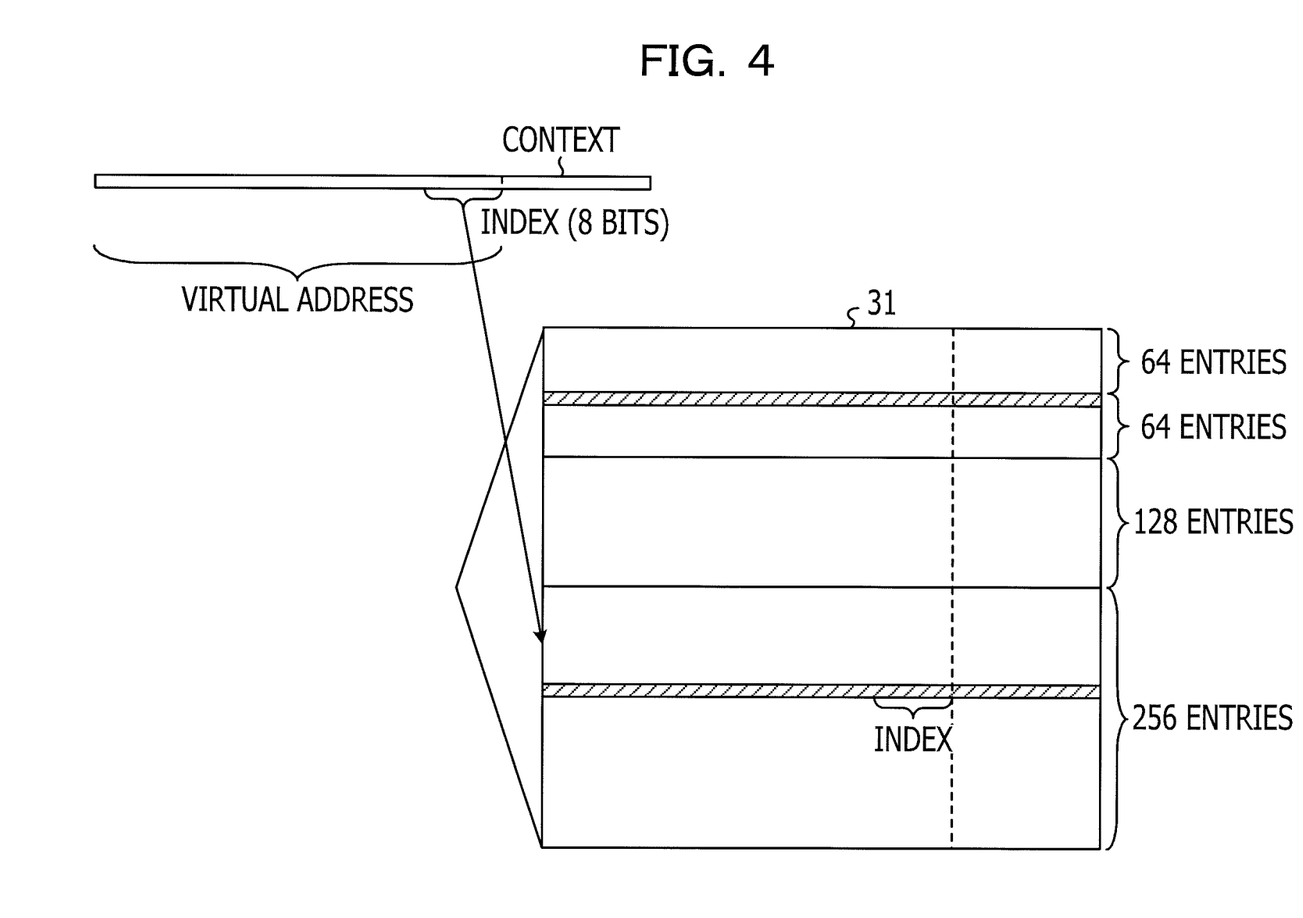
FIG. 4 is a diagram illustrating a manner of searching a tag unit.

Search for the target tag in the tag unit 31 will be further described with reference to FIG. 4. If a tag is to be searched for by the set associative method, search is executed using a part of the virtual address as an index. For example, when OP-sTLB TAG to which up to 256 entries are allocated is to be referred to, if eight bits of the virtual address are used as the index, the entry will be uniquely specified. Therefore, whether the virtual address to be searched for is present in OP-sTLB TAG is checked by executing a process of referring to the entry that the index matches in one clock cycle.

Likewise, when IF-sTLB TAG to which up to 128 entries are allocated is to be referred to, if seven bits of the virtual address are used as the index, the entry will be specified uniquely. Therefore, whether the virtual address to be searched for is present in IF-sTLB TAG is checked by executing a process of referring to the entry that the index matches in one clock cycle.

In addition, for example, part of the LSB (Least Significant Bit) side (low-order) address of the virtual address may be used as the index. If the virtual address is made up of a page number and offset, part of the LSB side (low-order) address of the page number is used as the index. Then, when an entry is to be registered into OP-sTLB TAG or IF-sTLB TAG, the entry is registered into a location corresponding to the index part of the virtual address.

On the other hand, the entry is registered independently of the virtual address by the full associative method, so that to which location the entry is registered is not found in referring to the tag. Thus, when OP-fTLB TAG and IF-fTLB TAG are to be referred to, for example, the tag is searched for in order starting from the head entry. Therefore, in many cases, clock cycles of the number corresponding to the maximum number of the entries are needed in search.

As described above, registration of the entries into the RAM by the full associative method takes more time than that by the set associative method. Therefore, the address translation buffer 20 searches the sTLB tag (OP-sTLB TAG or IF-sTLB TAG) first by the set associative method and then if search for the sTLB tag has not hit the tag, the address translation buffer 20 searches the fTLB tag (OP-fTLB TAG or IF-fTLB TAG) by the full associative method.

Figure 5:
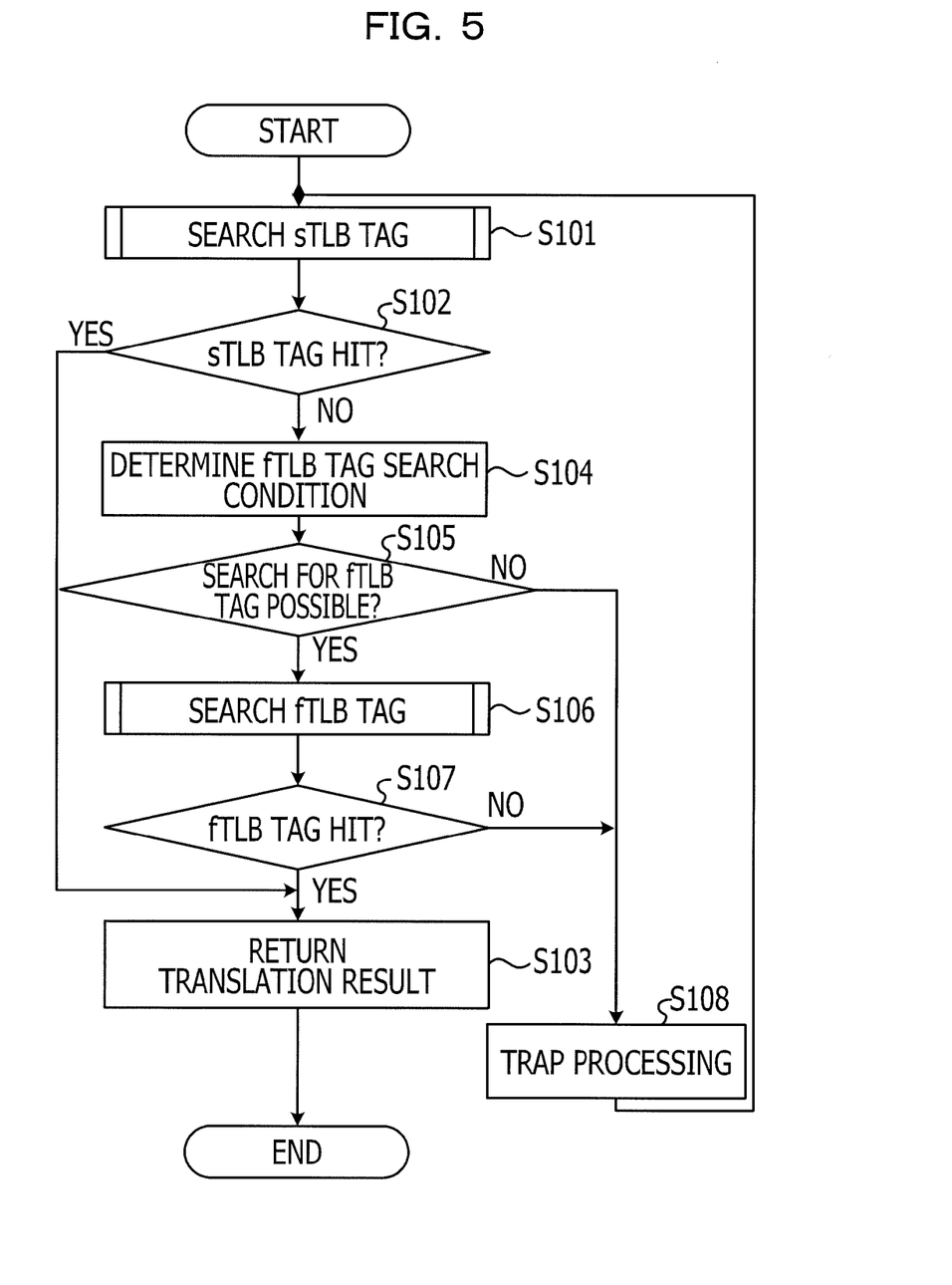
FIG. 5 is a flowchart of an address translating process executed using an address translation buffer.

FIG. 5 is a flowchart of an address translating process executed by the address translation buffer 20. The address translation buffer 20 searches for a combination of the virtual address received from the instruction control unit 11 with the context that the execution unit 12 has designated from the sTLB tags in the tag unit 31 (S101).

If it has been found that the combination of the virtual address with the context is registered in sTLB tags in the tag unit 31 and the TLB search unit 24 has output a value indicative of search hit (Yes in S102), the address translation pair corresponding to the virtual address is acquired from the data unit 32 and the virtual address is translated to the physical address with reference to the acquired address translation pair and a result of translation executed is output (S103).

On the other hand, if the combination of the virtual address with the context is not registered in sTLB tags in the tag unit 31 (No in S102), the address translation buffer 20 determines whether the combination of the virtual address received from the instruction control unit 11 with the context that the execution unit 12 has designated is to be searched for from the fTLB tags in the tag unit 31 (S104). Search for the fTLB tags (search for the combination from the fTLB tags) takes more time than that taken to search for the combination from the sTLB tags. Therefore, if it is set to search for the combination from the fTLB tags each time sTLB miss has occurred, the standby time of another instruction is increased. Thus, if it is set to execute search for the fTLB tags only when a certain condition is met in the case that sTLB miss has occurred, the standby time is reduced. For example, search for the fTLB tags is executed with respect to the oldest one of instructions which are being controlled using the instruction control unit 11.

When the above mentioned certain condition is not met and execution of search for the fTLB tags is impossible (No in S105), the process proceeds to trap processing which will be described later (S108). On the other hand, if execution of search for the fTLB tags is possible (Yes in S105), the address translation buffer 20 executes search for the fTLB tags (S106).

When the combination of the virtual address with the context is registered in fTLB tags in the tag unit 31 and the TLB search unit 24 has output a value indicative of search hit (Yes in S107), the address translation buffer 20 acquires the corresponding address translation pair from the data unit 32, translates the virtual address to the corresponding physical address and outputs a result of translation executed (S103), thereby terminating execution of the process.

On the other hand, when the combination of the virtual address with the context is not registered in fTLB tags in the tag unit 31 (No in S107), the address translation buffer 20 shifts to the trap processing (S108).

In the trap processing, the address translation pair corresponding to the virtual address for which search miss has occurred is read out of the page table held in the main memory 2 and the address translation pair is registered into the address translation buffer 20. Whether the address translation pair is to be registered in the sTLB tags or the fTLB tags is designated in advance for each address translation pair and the address translation pair is recorded in the page table.

Figure 6:
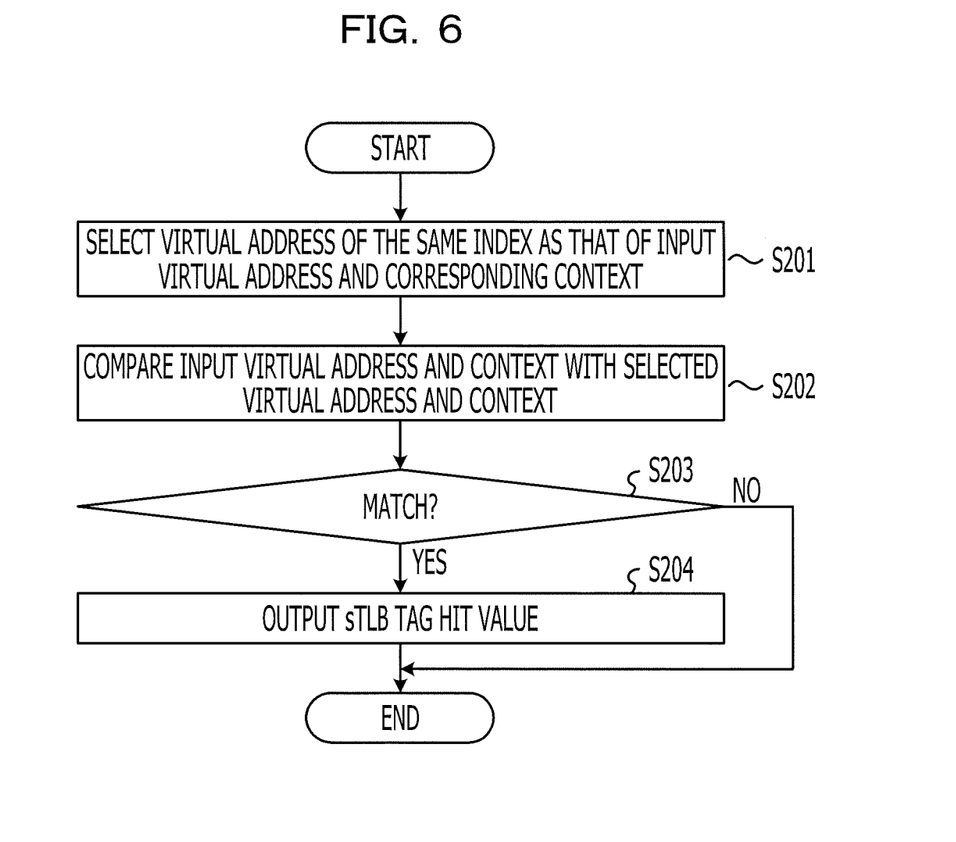
FIG. 6 is a flowchart illustrating a processing operation to search for an sTLB (set associative TLB) tag illustrated in FIG. 5.

FIG. 6 is a flowchart illustrating the processing operation of search for the sTLB tags illustrated in FIG. 5. In execution of search for the sTLB tags, first, a virtual address having the same index as that of a virtual address which has been input into the instruction control unit 11 and a context corresponding thereto are selected from within the entries of sTLB TAGs (S201).

Next, the input virtual address and context are respectively compared with the selected virtual address and context (S202). When the input virtual address matches the selected virtual address and the input context matches the selected context as a result of comparison (Yes in S203), a value indicative of sTLB hit is output (S204) and execution of the process is terminated.

Figure 7:
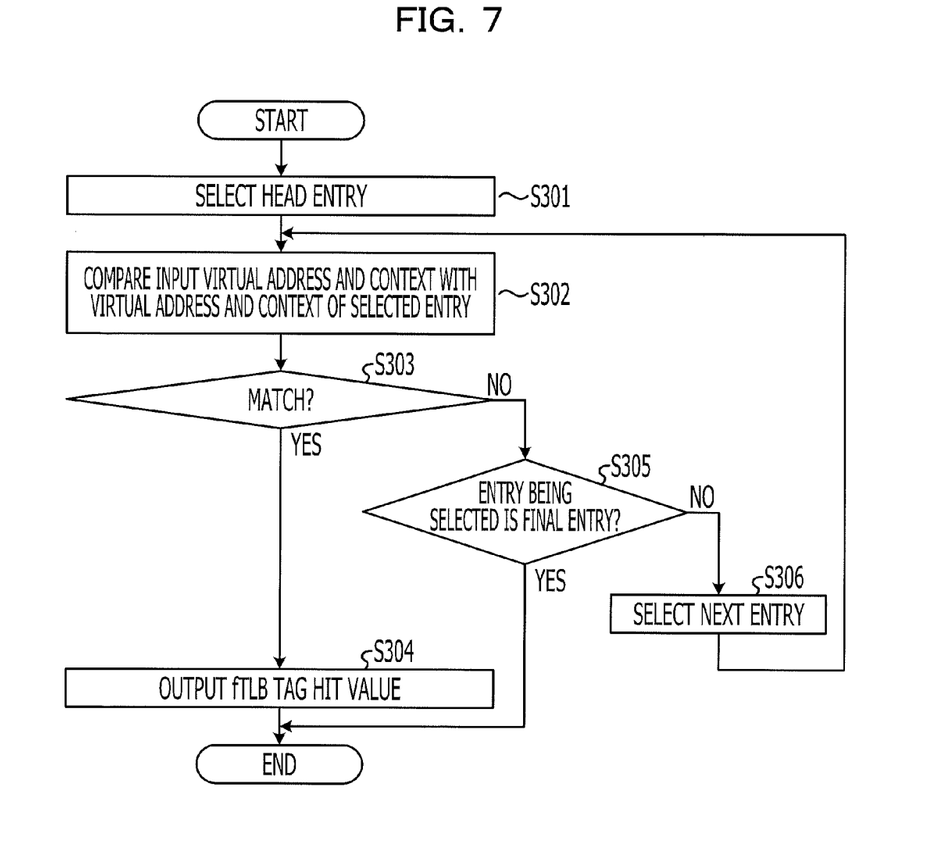
FIG. 7 is a flowchart illustrating a processing operation to search for an fTLB (full associative TLB) tag illustrated in FIG. 5.

FIG. 7 is a flowchart illustrating the processing operation of search for the fTLB tags illustrated in FIG. 5. In execution of search for the fTLB tags, the address translation buffer 20 selects the entry of the head of the fTLB tag (S301) and compares the input virtual address and context respectively with the virtual address and context of the selected entry (S302). When the input virtual address matches the selected virtual address and the input context matches the selected context as results of comparison (Yes in S303), the address translation buffer 20 outputs a value indicative of fTLB hit (S304) and terminates execution of the process.

On the other hand, when the input virtual address matches the selected virtual address and the input context does not match the selected context or when the input virtual address does not match the selected virtual address and the input context matches the selected context (No in S303), the address translation buffer 20 determines whether the entry which is being selected is the final entry of the fTLB tag (IF-fTLB TAG or OP-fTLB TAG) (S305). If the entry which is being selected is not the final entry (No in S305), the next entry is selected (S306) and the process returns to S302. On the other hand, if the entry which is being selected is the final entry (Yes in S305), execution of the process is terminated directly.

FIG. 7 illustrates an example of the operation of terminating the search at the point that the fTLB hit occurs. As an alternative, search may typically be executed continuously until the final entry is searched without terminating execution of search even when fTLB hit occurs. The operation of typically executing search until the final entry has been searched is realized by causing the process to shift to step S305 after step S304 in the flowchart in FIG. 7.

As described above, the address translation buffer 20 according to this embodiment is configured to register entries of the fTLB tags, which have been registered into the CAM, into the RAM. That is, some areas in the RAM are used as the areas dedicated to registration of the entries of the fTLB tags. As a result, both the entries of the fTLB tags registered in the RAM and the entries of the sTLB tags conventionally registered in the RAM are searched and hence the size of mounting area of the TLB in the processor is reduced without providing the CAM while maintaining the address searching function by the full associative method.

Circuits such as a comparison circuit used for address search used for the sTLB tags may also be used for the fTLB tags.

Therefore, the size of mounting area of the TLB and power consumption of the processor which have been desired so far for the conventional CAM is greatly reduced. In addition, the cost involved in development of the CAM, which is a large scale custom macro cell, is also reduced.

In order to search for the fTLB tags registered in the RAM, several clock cycles are needed for searching the entries allocated to the fTLB tags. Thus, the address translation buffer 20 first searches the sTLB tags and then searches the fTLB tags only when the target entry is not present. The probability that sTLB tags (having capacity larger than fTLB) be used is higher than that of fTLB tags (having capacity smaller that sTLB) and the probability that the target entry be registered in the fTLB tags is lower than that in the sTLB tags. Therefore, the probability that the number of clock cycles necessary to search for the fTLB tags is reduced by preferentially searching the sTLB tags.

In addition, although the entries necessary for execution of the trap processing are mainly registered in the fTLB tags, an increase in the number of clock cycles caused by search for the fTLB tags is small as compared to the number of clock cycles necessary for execution of the trap processing, and hence the influence of performance degradation caused by execution of the trap processing is also small.

In addition, the increase in the number of clock cycles caused by search for the fTLB tags is suppressed by setting a limitation on a request to search for the fTLB tags and by searching for the fTLB tags only when search is necessary. As a result, performance degradation caused by a situation, in which search for the sTLB tags based on another request may not be performed because access to the RAM is not completed while the fTLB tags are being searched based on a certain request, may be avoided.

In the first embodiment, an example in which the TLB structure using the 1-way set associative method and direct mapping method is utilized has been described. In a second embodiment, an example in which a TLB structure using a 2-way set associative method will be described.

Figure 8:
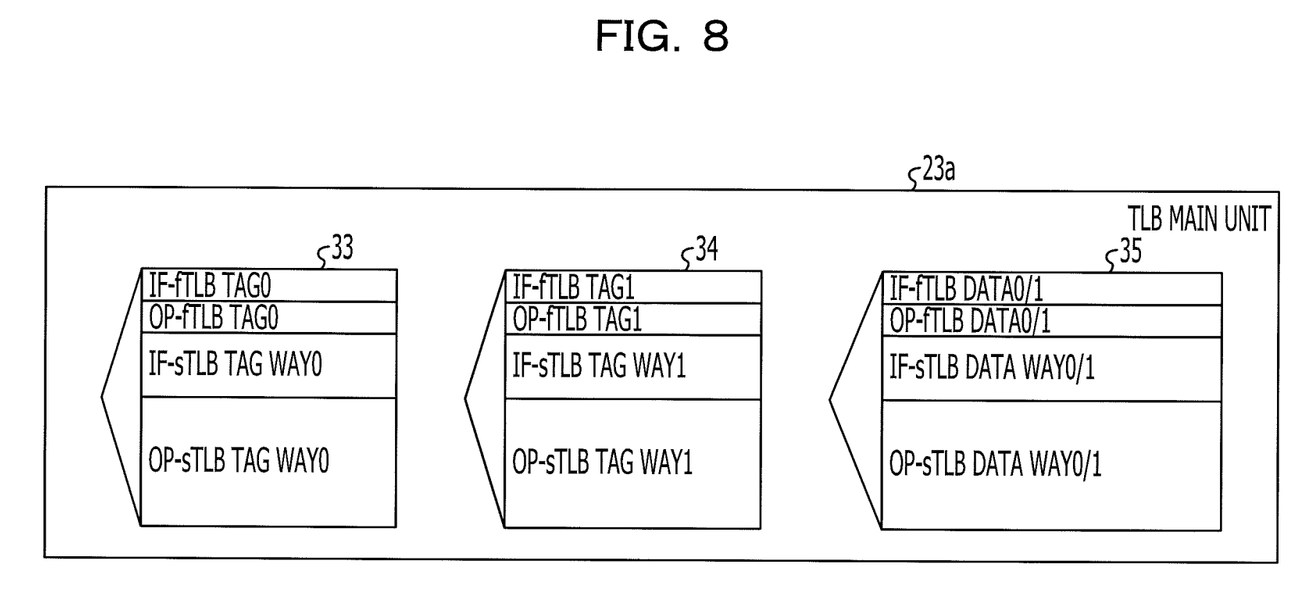
FIG. 8 is a diagram illustrating a TLB main unit according to a second embodiment.

FIG. 8 is a diagram illustrating a TLB main unit according to the second embodiment. A TLB main unit 23a illustrated in FIG. 8 includes a tag unit 33 for way0, a tag unit 34 for way1 and a data unit 35 used for both way0 and way1. Each of the tag units 33 and 34 and the data unit 35 is configured using a RAM.

Entries are individually registered into the tag unit 33 for way0 tags and the tag unit 34 for way1 tags, so that the TLB main unit 23a holds two entries for each index.

Each of the tag units 33 and 34 includes a first area in which an entry is referred to by the set associative method and a second area in which an entry is referred to by the full associative method. In other words, both the tags referred to by the set associative method and the tags referred to by the full associative method are registered in the RAM of each tag unit.

The tag unit 33 includes IF-sTLB TAG WAY0 as a tag for instruction use and OP-sTLB TAG WAY0 as a tag for data use in the area to be referred to by the set associative method. The tag unit 33 also includes IF-fTLB TAG0 as a tag for instruction use and OP-fTLB TAG0 as a tag for data use in the area to be referred to by the full associative method.

The tag unit 34 includes IF-sTLB TAG WAY1 as a tag for instruction use and OP-sTLB TAG WAY1 as a tag for data use in the area to be referred to by the set associative method. The tag unit 34 also includes IF-fTLB TAG1 as a tag for instruction use and OP-fTLB TAG1 as a tag for data use in the area to be referred to by the full associative method.

Address translation pairs corresponding to the respective entries in the tag units 33 and 34 are registered in the data unit 35.

The tag units 33 and 34 serve to increase a speed at which tags are referred to by using a plurality of ways simultaneously in the reference executed by the full associative method. A 2-way cache memory including two RAMs is capable of searching two entries simultaneously, so that the number of search clock cycles necessary for search for the fTLB tags are halved by searching the fTLB tags in units of two entries simultaneously. Although, in the second embodiment, 2-way search is described by way of example, a search speed is increased by executing simultaneous search as the number of ways is increased.

The use of a plurality of tag units in search by the full associative method is effective to increase the searching speed and reliability.

In an existing system, TLB entries used for basic address translation of the system are registered into fTLB tags in a CAM and the frequency at which an entry is rewritten is low. Since an address translation pair used for the system operation in a system area of an OS is registered, when an error has occurred because of data being changed, a system down may immediately occur to cause a serious system failure. CAM is generally made up of a latch circuit, where soft errors such as data inversion may not often occur, and hence errors may not often occur in the CAM. However, the frequency of errors occurred in the RAM is higher than the frequency of errors occurred in the latch circuit. On the other hand, the circuit scale of the CAM is larger than the circuit scale of the RAM, and hence the rate at which soft errors occur in the CAM which is calculated by multiplying the frequency of errors occurred in the latch circuit by the size of mounting area of the latch circuit is relatively high.

Figure 9:
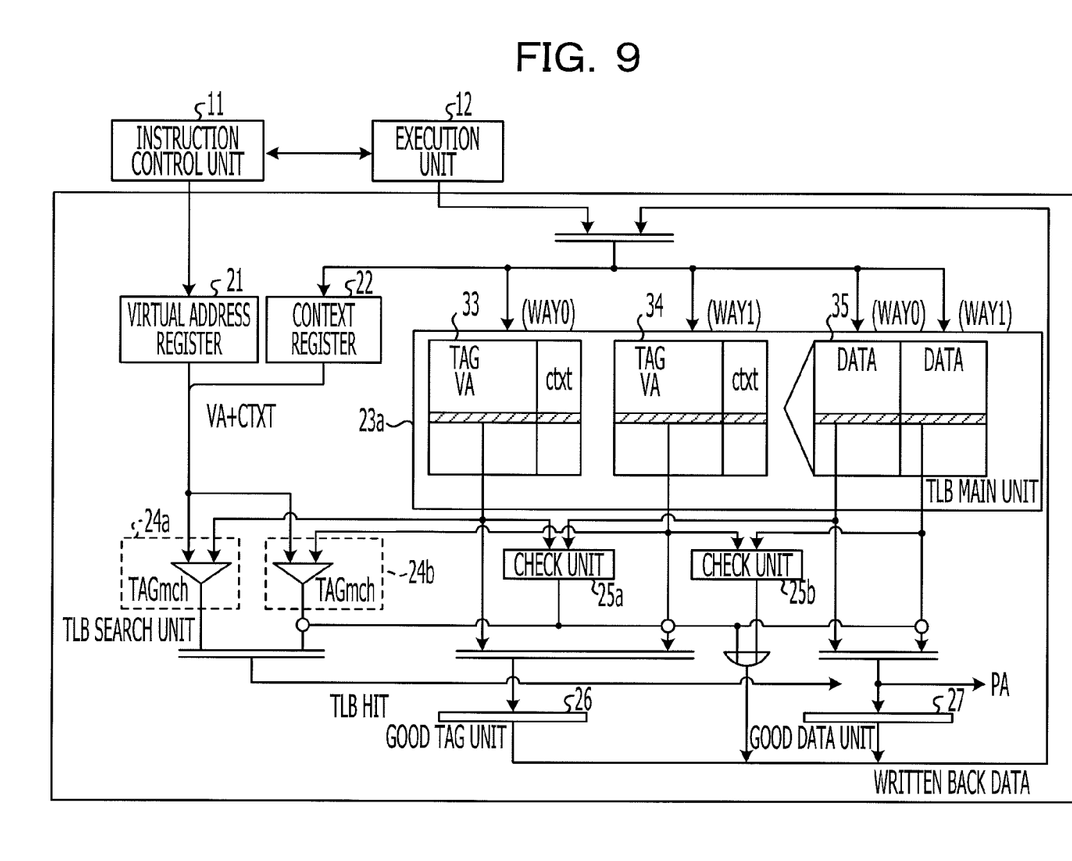
FIG. 9 is a diagram illustrating an example of a configuration that an entry is duplexed by using two fTLB entries.

FIG. 9 is a diagram illustrating an example of a configuration that each entry is duplexed by using two fTLB tags. The system may normally operate with no delay and without causing any system failure by duplexing each entry of the fTLB tag, even if an error such as bit inversion of one entry of the fTLB tag is caused in the RAM. In addition, the size of mounting area of the TLB in the processor is reduced by eliminating the CAM, so that the soft error occurrence rate is reduced, too.

When bit inversion or the like has occurred and caused an error in the entry of the fTLB tag, the data is immediately rewritten to correct the error which has occurred, thereby increasing the reliability of the fTLB tag.

In the configuration illustrated in FIG. 9, each entry of the fTLB tag is duplexed by registering the same entry into the fTLB tag in each of the tag units 33 and 34. Each entry of the fTLB tag is duplexed by utilizing the existing circuit used for the sTLB tag. Thus, the reliability of the fTLB tag is increased by duplexing the entry with no addition of a circuit. If an error has occurred in one entry, the TLB tag searching operation is executed in the same manner as that executed under the normal condition by utilizing another normal entry when the entry is to be read, a result of address translation executed is returned to a source from which a request has been made and the normal entry is registered again into the RAM in place of the error occurred entry, thereby automatically correcting the error.

Explaining in more detail, a virtual address and a context which have been read out of one fTLB tag in the tag unit 33 are input into a TLB search unit 24a and a check unit 25a. Likewise, a virtual address and a context which have been read out of one fTLB tag in the tag unit 34 are input into a TLB search unit 24b and a check unit 25b.

The TLB search unit 24a compares a combination of a virtual address held in the virtual address register 21 and a context held in the context register 22 with an input from the tag unit 33 and outputs the result of comparison executed. The TLB search unit 24b compares the virtual address held in the virtual address register 21 with the virtual address read out of the fTLB tag in the tag unit 34, and the TLB search unit 24b also compares the context held in the context register 22 with the context read out of the fTLB tag in the tag unit 34 and outputs respective results of comparison executed.

The check unit 25a receives the virtual address and the context read out of the fTLB tag in the tag unit 33 and data read out of the data unit 35 corresponding to the virtual address read out of the fTLB tag in the tag unit 33, performs parity check, and outputs the result of the parity check executed. Likewise, the check unit 25b receives the virtual address and the context read out of the fTLB tag in the tag unit 34 and data read out of the data unit 35 corresponding to the virtual address read out of the fTLB tag in the tag unit 34, performs parity check, and outputs the result of the parity check executed.

When no parity error is found in the data read out of the data unit 35 as a result of check executed by the check unit 25a, an output from the TLB search unit 24a is used. On the other hand, if an error is found in the output from the TLB search unit 24a as the result of check executed by the check unit 25a and no error is found as a result of check executed by the check unit 25b, an output from the TLB search unit 24b is used.

Further, an entry in the tag unit having no error is registered into a good tag unit 26 and an entry in the data unit corresponding to the tag unit having no error is registered into a good data unit 27. The contents registered in the good tag unit 26 and the good data unit 27 are written back into the entries of the fTLB tag in the error occurred tag unit and corresponding data in data unit, thereby correcting errors.

Figure 10:
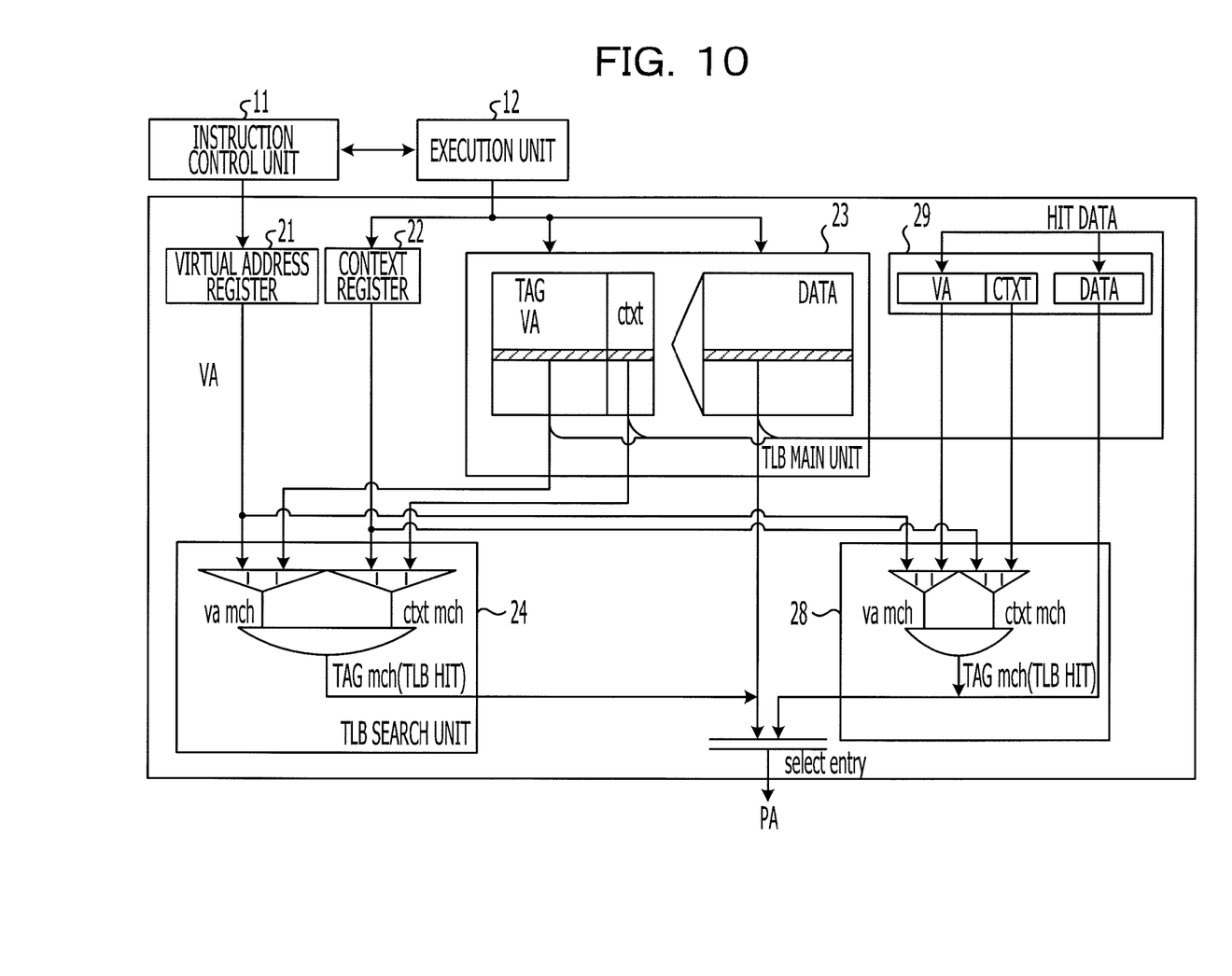
FIG. 10 is a diagram illustrating an example of a configuration in which a latch for holding a part of the fTLB tag registered into a RAM is installed.

In a modified example of the first embodiment, an address translation buffer further includes a latch for holding part of the fTLB tags registered in the RAM. FIG. 10 is a diagram illustrating an example of a configuration of the address translation buffer in which a latch for holding part of the fTLB tags registered in the RAM is provided.

In the configuration illustrated in FIG. 10, a latch 29 and a latch search unit 28 are provided. The latch 29 holds the content of one entry of each fTLB tag as a cache memory independently of the RAM. The latch search unit 28 searches for the contents in the latch 29. The TLB search unit 24 and the latch search unit 28 may execute search simultaneously.

An entry which has hit the target fTLB tag is registered into the latch 29 when a result of address translation executed is returned to a source from which a request has been made. Although an example in which the content of one entry is latched is illustrated in FIG. 10, a latch for holding the contents of two or more entries may be provided.

As described above, the size of mounting area of the TLB and the power consumption of the processor may be reduced by eliminating the CAM while maintaining the address searching function based on the full associative method by using the configuration according to the second embodiment as in the case in the first embodiment.

In addition, when the 2-way system is used, high-speed search for the fTLB tags and improvement in reliability of the fTLB tags may be obtained.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A system comprising:
a main memory; and
a processor coupled to the main memory, the processor including an address translation buffer for translating a virtual address to a corresponding physical address, the address translation buffer comprising:
a random access memory including a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched;
a search unit that searches the first area for an address translation pair by using a index tag included in a virtual address to be translated, and searches the second area for the address translation pair by using a whole part of the virtual address to be translated;
a holding unit that holds a part of the address translation pairs stored in the second area; and a second search unit that searches the holding unit for the address translation pair corresponding to the virtual address to be translated.

2. A system comprising:
a main memory; and
a processor coupled to the main memory, the processor including an address translation buffer for translating a virtual address to a corresponding physical address, the address translation buffer comprising:
a random access memory including a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched; and
a search unit that searches the first area for an address translation pair by using a index tag included in a virtual address to be translated, and searches the second area for the address translation pair by using a whole part of the virtual address to be translated, wherein
the search unit starts to search the second area for the address translation pair when the address translation pair is not found in the first area, and the address translation meets a predetermined condition.

3. The system according to claim 2, wherein the address translation buffer further comprises:
a plurality of random access memories; and
a plurality of search units that search the random access memories respectively for the address translation pair corresponding to the virtual address to be translated.

4. The system according to claim 3, wherein the address translation buffer further comprises:
a verification unit that verifies the address translation pairs when the virtual address is translated to the physical address and the address translation pairs are read out of the second areas individually included in the plurality of random access memories; and
a selection unit that selects one of the plurality of address translation pairs read out of the plurality of second areas based on a result of verification of the address translation pairs by the verification unit.

5. An address translating method for a processor including an address translation buffer that comprises a random access memory having a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched, the address translating method comprising:
searching the first area for an address translation pair by using a index tag included in a virtual address to be translated;
searching the second area for the address translation pair by using a whole part of the virtual address to be translated;

holding, by a holding unit included in the address translation buffer, a part of the address translation pairs stored in the second area; and
searching the holding unit for the address translation pair corresponding to the virtual address to be translated.

6. An address translating method for a processor including an address translation buffer that comprises a random access memory having a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched, the address translating method comprising:
searching the first area for an address translation pair by using a index tag included in a virtual address to be translated;
searching the second area for the address translation pair by using a whole part of the virtual address to be translated; and
starting the search of the second area for the address translation pair when the address translation pair is not found in the first area, and the address translation meets a certain condition.

7. The address translating method according to claim 6, wherein the address translation buffer includes a plurality of memory units, and
the address translating method further comprises searching the memory units respectively for the address translation pair corresponding to the virtual address to be translated.

8. The address translating method according to claim 7, further comprising:
verifying the address translation pairs when the virtual address is translated to the physical address and the address translation pairs are read out of the second areas individually included in the plurality of memory units, and
selecting one of the plurality of address translation pairs which have been read out of the plurality of second areas based on a result of the verifying.

9. A processor including an address translation buffer for translating a virtual address to a corresponding physical address, the address translation buffer comprising:
a random access memory including a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched;
a search unit that searches the first area for an address translation pair by using a index tag included in a virtual address to be translated, and searches the second area for the address translation pair by using a whole part of the virtual address to be translated;
a holding unit that holds a part of the address translation pairs stored in the second area; and
a second search unit that searches the holding unit for the address translation pair corresponding to the virtual address to be translated.

10. A processor including an address translation buffer for translating a virtual address to a corresponding physical address, the address translation buffer comprising:
- a random access memory including a first area with a plurality of first entries storing a first plurality of address translation pairs of a virtual address to be searched and a physical address corresponding to the virtual address, each of the first address translation pairs being subjected to a index tag which is a part of the virtual address to be searched, and a second area with a plurality of second entries storing a second plurality of address translation pairs, each of the second address translation pairs being subjected to a whole part of the virtual address to be searched; and
- a search unit that searches the first area for an address translation pair by using a index tag included in a virtual address to be translated, and searches the second area for the address translation pair by using a whole part of the virtual address to be translated, wherein
- the search unit starts to search the second area for the address translation pair when the address translation pair is not found in the first area, the address translation meets a predetermined condition.

11. The processor according to claim 10, wherein the address translation buffer further comprises:
- a plurality of random access memories, and
- a plurality of search units that search the random access memories respectively for the address translation pair corresponding to the virtual address to be translated.

\* \* \* \* \*